United States Patent [19]
Brown, Jr. et al.

[11] Patent Number: 5,896,648
[45] Date of Patent: Apr. 27, 1999

[54] QUICK SETUP EXPANDING ARBOR FOR LAMINATION ASSEMBLY OF AN ELECTROCHEMICAL MACHINE

[75] Inventors: Jasper J. Brown, Jr., Bogart; Steven W. Addison, Athens, both of Ga.

[73] Assignee: Reliance Electric Industrial Company, Cleveland, Ohio

[21] Appl. No.: 08/970,033

[22] Filed: Nov. 13, 1997

[51] Int. Cl.[6] ............................. B23P 19/00; H01K 15/02
[52] U.S. Cl. .................... 29/732; 414/27; 414/788; 29/596
[58] Field of Search .................... 29/243.518, 281.5, 29/596, 732, 738, 759, 714; 414/27, 788, 796

[56] References Cited

U.S. PATENT DOCUMENTS

3,378,907  4/1968  Dixon ............................. 29/714
4,079,512  3/1978  Lakes ............................. 29/732

*Primary Examiner*—Carl E. Hall
*Assistant Examiner*—Davide Caputo
*Attorney, Agent, or Firm*—Craig N. Killen; John M. Miller; John J. Horn

[57] ABSTRACT

An expandable arbor is provided for assembling a plurality of laminas into a lamination, wherein each lamina has a central opening and a plurality of slots extending radially from the central opening. The arbor includes a base portion and an expandable core that is disposed to extend axially from the base portion. The arbor further includes a plurality of key holders disposed around the core. Each key holder is configured in the form of an elongated shaft that extends axially from the base portion and has a polygonal transverse cross-section. Each key holder is further configured with a plurality of faces, and each face defines a key receptacle therein for holding a key.

9 Claims, 9 Drawing Sheets

QUICK SETUP EXPANDING ARBOR FOR LAMINATION ASSEMBLY OF AN ELECTROCHEMICAL MACHINE

BACKGROUND OF THE INVENTION

The present invention relates generally to the manufacture of electromechanical machines, such as electric motors. More particularly, the invention relates to an expanding arbor used in manufacturing a laminated stator or armature for use in such a machine.

Expanding arbors are often used in the manufacture of lamination assemblies. For example, an expanding arbor may be employed to hold a stack of individual laminas that are to be connected together by welding or cleating. A laminated stator formed in this manner has a cylindrical central opening through which the rotor of the electromechanical machine extends. The lamina includes a plurality of individual teeth defining slots that carry the machine windings. It will be appreciated that each individual lamina is similarly provided with a central opening and these radially extending slots.

In order to produce a stator lamination assembly, the laminas must be aligned and stacked to the proper height. To achieve this result, the individual laminas are stacked on the arbor, which has a vertical core that passes through the central openings of the stacked laminas. In operation, the vertical core expands radially against the inner circumference of the individual laminas. As a result, the central openings of all of the laminas stacked on the arbor are concentrically aligned.

It also is necessary to radially align all of the slots of the individual laminas before the lamina stack can be connected together to form the lamination assembly. This is typically accomplished using a plurality of hardened fixtures known as alignment keys. The keys are symmetrically spaced about the vertical core member so that each key engages a corresponding slot gap in each of the laminas. Typically, four to six keys are used in order achieve desired quality levels of the finished product. The keys collectively function to force the slots of each lamina into radial alignment with the slots of the other laminas. Each key is sized and configured for the slot of the stator being stacked on the arbor. Different stators have varying numbers of slots, and slots with different gaps. Each such gap requires a correspondingly sized key.

Setting up expanding arbors of the prior art for different lamination sizes and types is time consuming. Before the laminas of a new stator are stacked onto the arbor, the vertical core member must be equipped with the keys required for the particular slot gap of that stator. It may take approximately twelve to fifteen minutes to set up an arbor with the new alignment keys. This set-up time is inefficient, and thus impacts the productivity of the manufacturing facility.

SUMMARY OF THE INVENTION

The present invention recognizes and addresses the foregoing disadvantages, and others, of prior art constructions and methods. Accordingly, it is an object of the present invention to provide a novel expanding arbor for aligning a stack of electromagnetic machine laminas.

It is a further object of the present invention to provide an expanding arbor with a plurality of differently-sized aligning keys at each key location.

It is a more particular object of the present invention to provide an expanding arbor that permits quick changeover from one size aligning key to another.

It is a particular object of the present invention to provide an expanding arbor whereby keys at all of the key locations can be simultaneously changed to set up the arbor for a different lamination.

Objects of the present invention are achieved by an expandable arbor for assembling a plurality of laminas into a lamination stack, wherein each lamina defines a central opening and a plurality of radial slots. The arbor includes a base portion and an expandable core extending axially therefrom. A plurality of key holders are disposed at predetermined locations around the core member. Each key holder contains a plurality of differently-sized aligning keys.

A mechanism is preferably provided for simultaneously rotating each key holder to orient a preselected key into an operative position. In some exemplary embodiments, the simultaneous rotating mechanism includes a center sun gear and a plurality of planet gears rotatably mounted with respect to the base member. Each planet gear is connected to one of the key holders and is disposed to engage the center sun gear such that rotation of one of the key holders causes rotation of the other key holders.

Other objects and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
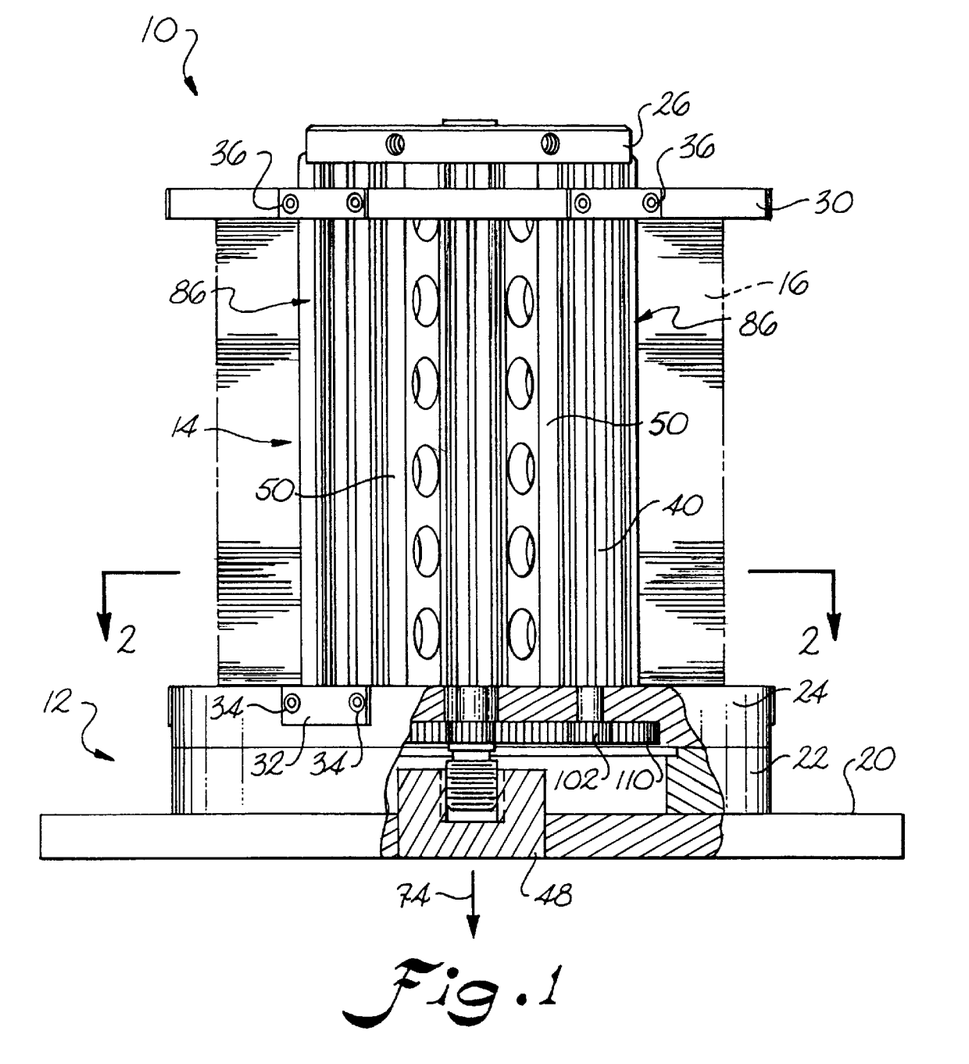
FIG. 1 is an elevational view of a presently preferred embodiment of the invention with portions cut away and shown in cross-section, and stacked lamina indicated in phantom.
Figure 2:
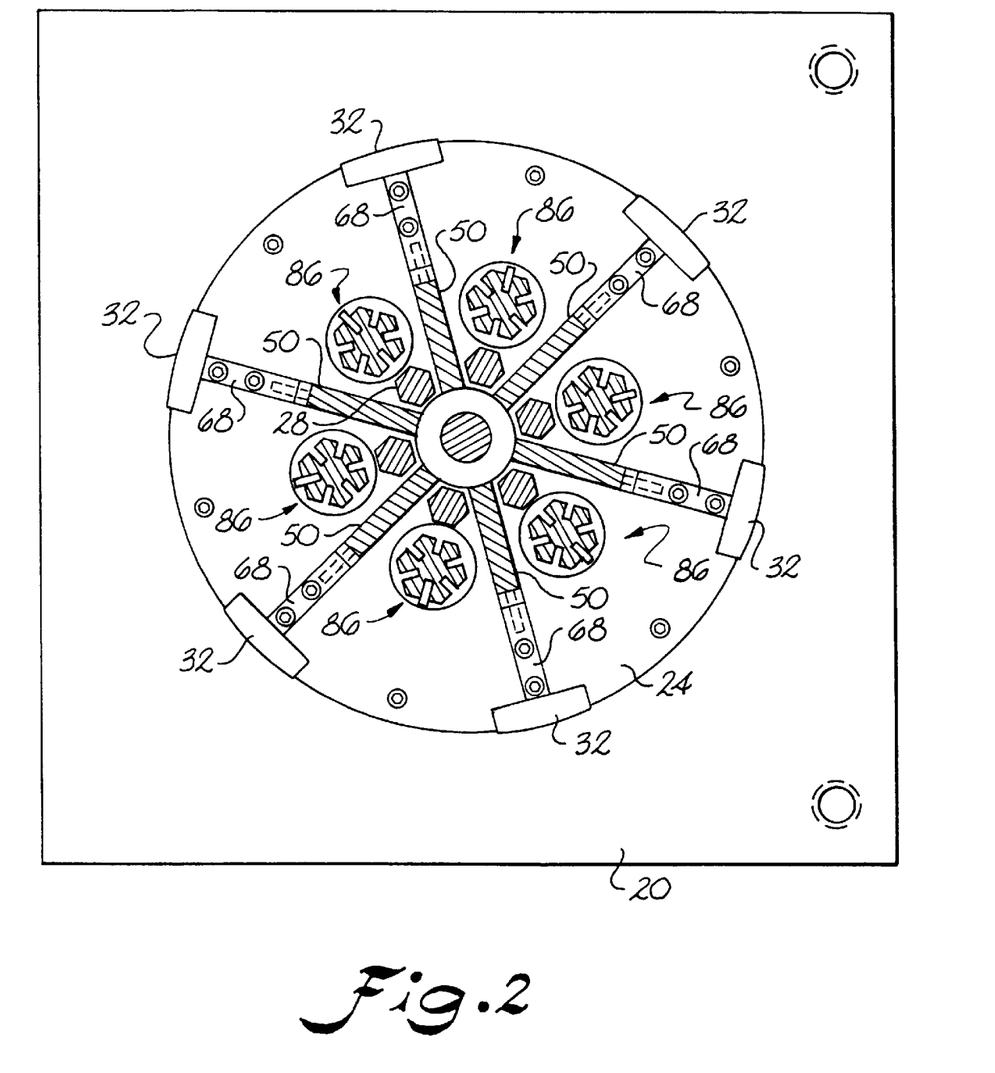
FIG. 2 is a cross-sectional view taken along line 2—2 of FIG. 1.

Referring now to FIG. 1, an arbor apparatus constructed in accordance with the present invention is indicated generally at 10. Arbor 10 includes a base portion 12 having an expandable core 14 extending axially therefrom in a vertical direction. A plurality of individual laminas (shown in phantom at 16) are stacked on base portion 12 about core 14. A single lamina 16 is indicated in phantom in FIG. 3, and the central opening of the lamina 16 is defined by the inner circumference 18.

Figure 8:
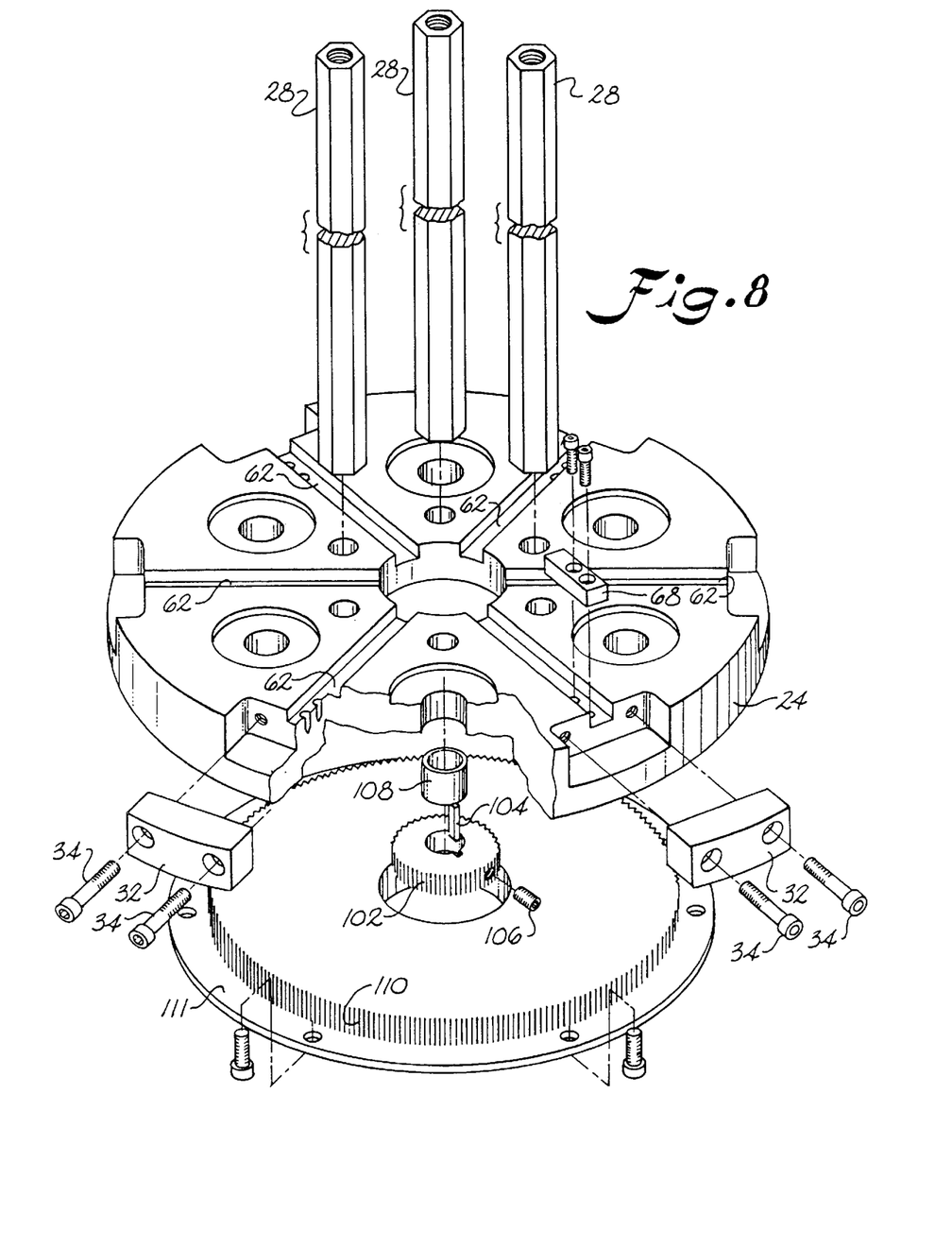

Base portion 12 includes a horizontally extending main base 20, a bottom spacer plate 22 and a bottom insert plate 24. The height of core 14 is defined by a top plate 26 separated from base portion 12 by a predetermined axial distance. As can be seen in FIG. 8, top plate 26 is supported by a plurality of spacer rods 28 extending from insert plate 24. Spacer rods 28 are preferably secured such as by screws 29. A top insert plate 30 is placed on the lamina stack to compress the stack during the welding process.

As known, both insert plate 24 and insert plate 30 include copper inserts 32 and 34, respectively, at the location of arc initiation in the welding process. Generally, the lamina stack will be welded axially at several spaced apart locations along its outer circumference. In this case, the lamina stack will be welded at six such locations. Accordingly, bottom insert plate 24 has six copper inserts 32 held in place by any suitable means, such as screws 34. Top insert plate 30 similarly has six copper inserts 36.

Figure 4:
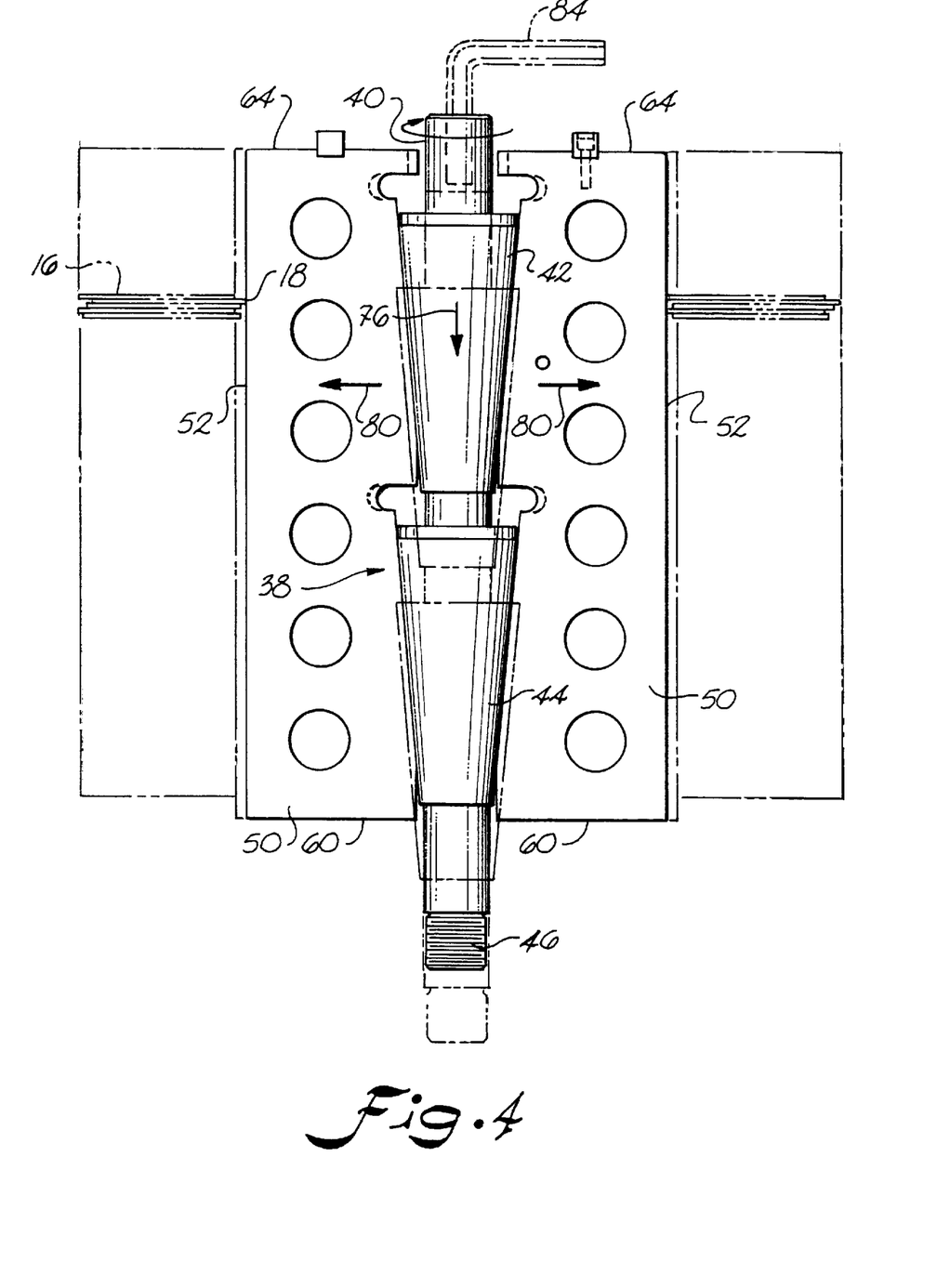
FIG. 4 is an elevational view showing operation of the expanding mechanism to align a stack of individual laminas.
Figure 5:
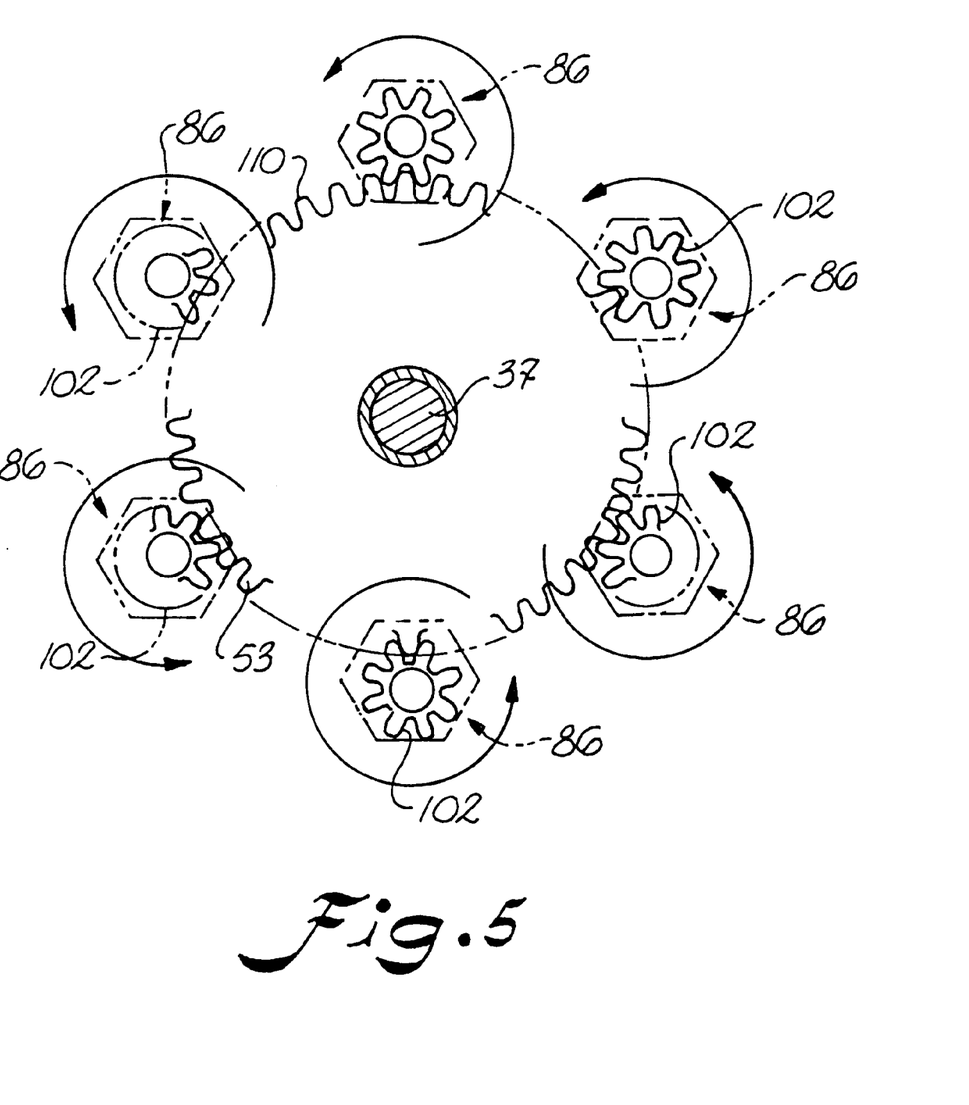
FIG. 5 schematically illustrates functional aspects of a preferred mechanism of simultaneously rotating a plurality of angularly spaced key holders.
Figure 7:
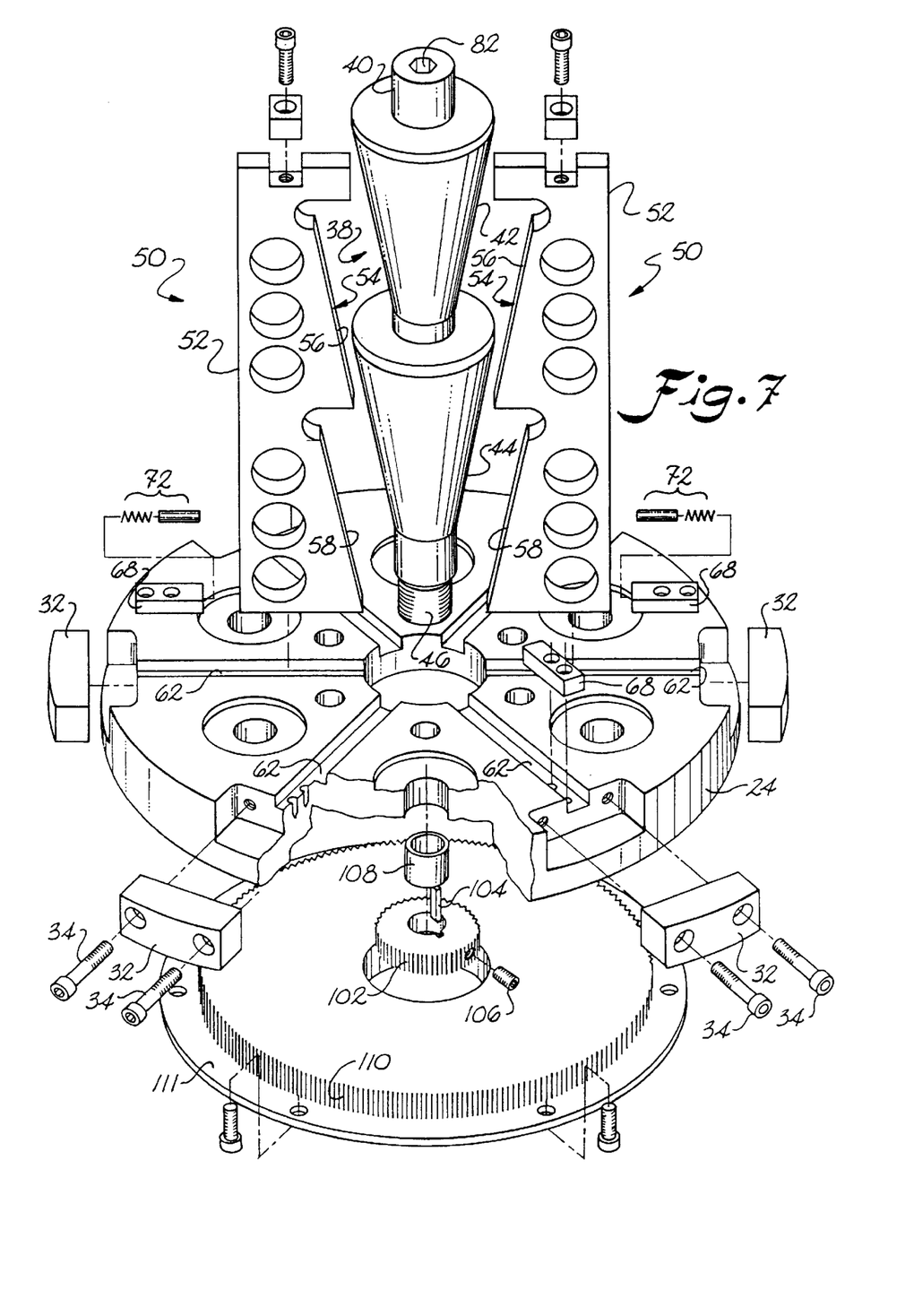

As shown in FIGS. 4 and 7, core 14 includes an expanding mandrel 38. Mandrel 38 includes a top end 40 integrally extending into a pair of conical portions 42 and 44. As shown in FIG. 1, threaded bottom end 46 is threadingly received in a receiver element 48 located in a bore defined in main base 20.

The expanding mechanism of core 14 further includes a plurality of expanding blades 50, in this case six, disposed symmetrically about mandrel 38. As shown in FIG. 7 for example, each expanding blade 50 has a vertically straight outer edge 52 disposed opposite an inner edge 54 having a pair of tapered portions 56 and 58. Tapered portions 56 and 58 are generally complementary to the respective outer surfaces of conical portions 42 and 44. Outer edge 52 preferably defines an arc since it will engage the inner circumference of the lamina opening.

Figure 6:
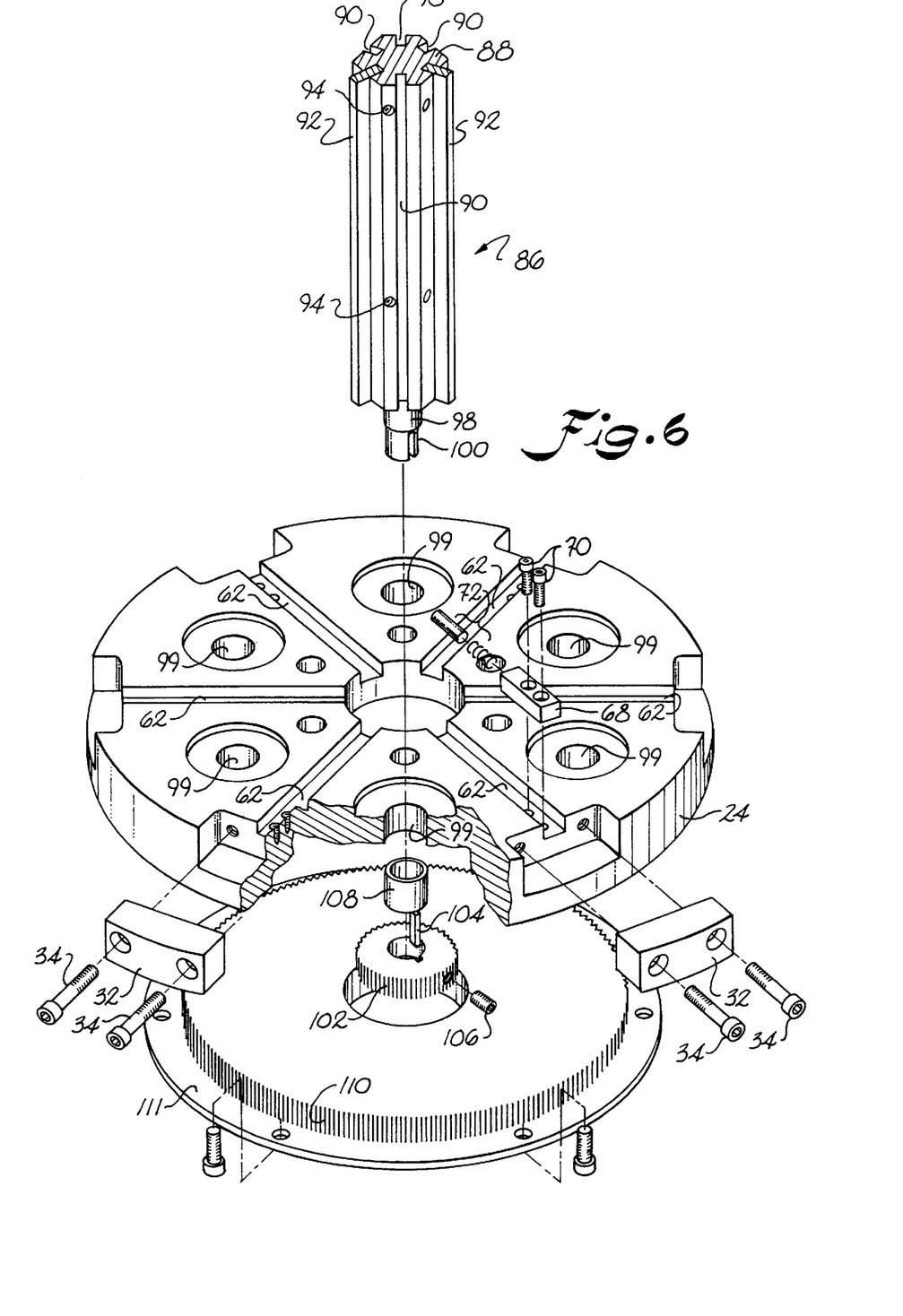
FIGS. 6 through 9 are perspective assembly views illustrating further details of the presently preferred embodiment.
Figure 9:
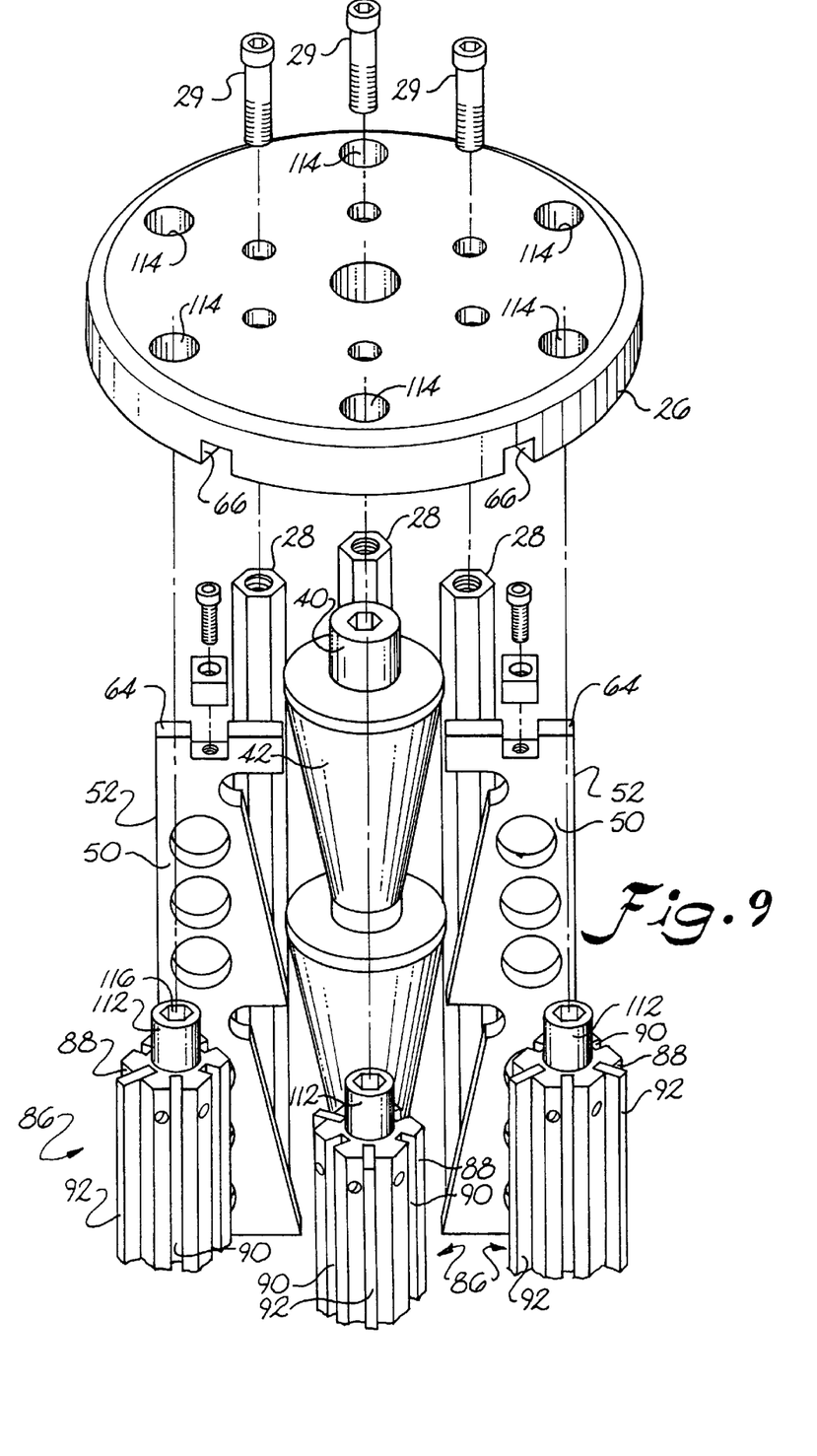

The bottom edges 60 of blades 50 are received slidably in grooves 62 formed in insert plate 24, which can be easily seen in FIGS. 6 through 8. As shown in FIG. 9, the top edges 64 of blades 50 are slidably received in grooves 66 formed in top plate 26. When blades 50 are disposed in grooves 62 and 66, outer edges 52 will be disposed perpendicularly with respect to base portion 12. Preferably, at least grooves 62 include respective stop elements 68 to limit radial movement of blades 50. Stop elements 68 may be secured in position by any suitable means, such as screws 70. Respective spring assemblies 72 may be harbored by stop elements 68, as shown, to urge the associated expansion blade back to its at rest position.

As shown in FIGS. 1 and 4, concentric alignment of laminas 16 proceeds when receiver element 48 is drawn downward, as indicated by arrows 74 and 76. In one preferred embodiment, receiver element 48 defines a hook on its underside that can be engaged by a linkage from a suitable mechanical actuator, such as a hydraulic cylinder. Generally, the mechanical actuator can be operated by a plant worker utilizing a foot pedal control or the like.

The downward movement of mandrel 38 causes blades 50 to move radially outwardly in the direction indicated by the arrows 78 and 80. Outer edges 52 of blades 50 push against the inner circumference 18 of laminas 16 in order to align them concentrically, as desired.

Top end 40 of mandrel 38 may define a hex opening 82 (FIG. 7). As shown in FIG. 4, a hex tool 84 can be inserted into hex opening 82 to permit manual rotation of mandrel 38. In the manner, the amount of expansion which blades 50 will undergo during operation can be adjusted or fine tuned, such as may be necessary at set up.

In accordance with the present invention, a plurality of key holders 86 are disposed at selected locations around expandable core 14. The number of key holders can vary to suit the design of the arbor, but four to six may be typical. Each key holder is configured and disposed to extend axially from the base portion 12. Moreover, each key holder is further configured to hold simultaneously a plurality of alignment keys.

In the illustrated embodiment, each key holder 86 defines an elongated bar 88 having a polygonal transverse cross-section with a plurality of faces. Each such face defines a key receptacle 90 configured to receive an alignment key 92 therein. The number of faces, and thus the number of keys that each key holder is capable of holding, can vary to suit the design and capability of the arbor.

As shown in FIG. 6, for example, each bar 88 has a hexagonal transverse cross-section, defining six faces. Key receptacles 90 are formed as radial slots extending axially along substantially the entire length of bar 88. The respective keys 92 may be held in the slots using set screws, as indicated at 94.

Figure 3:
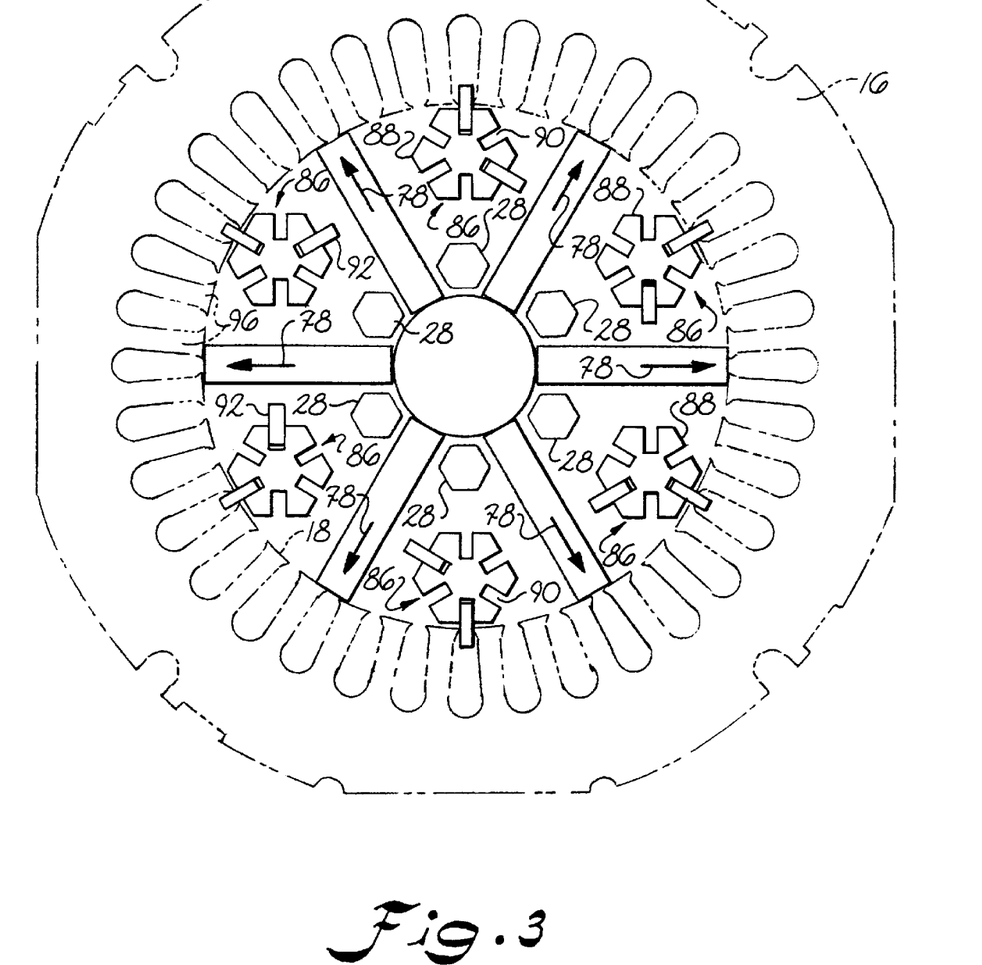
FIG. 3 is a schematic diagram showing expansion against the inner circumference of an individual lamina.

In the embodiment shown, the arbor is configured to hold six different sets of alignment keys, one for each face of each elongated bar 88. As shown in FIG. 3 for example, the width of a particular key is intended to correspond to the gap between adjacent teeth 96 of the laminas 16. Thus, the multiple keys held by elongated bars 88 can have different widths so that six different laminas with different tooth gaps can be accommodated.

In accordance with the present invention, a mechanism is provided for simultaneously rotating each key holder in order to orient a preselected alignment key into an operative position on the arbor. A spring-loaded detente is provided in bars 88 to determine and hold the selected position. A pointer/indicator may be provided at the top of one of bars 88 to show the operator what size key has been selected and that rotation to the desired position has been achieved.

As shown in FIG. 6, one end of each bar 88 is configured in the form of a rotatable mounting post 98. Mounting post 98 extends through a bore 99 defined for this purpose in insert plate 24. On the underside of insert plate 24, an extension portion 100 of mounting post 98 is received in a hole defined in a respective planet gear 102. Relative rotation between extension portion 100 and gear 102 may be prevented in a well known manner utilizing a key 104. Gear 102 is maintained in position using a set screw that engages extension portion 100. An annular spacer 108 may be provided to ensure that gear 102 will be located at the desired axial position. A center sun gear 110 is rotatably mounted about mandrel 38 to engage the gearing of each planet gear 102. A keeper plate 111 is attached to the underside of insert plate 24 to retain the various gears therein.

Referring now to FIG. 9, bars 88 each have an upper shaft 112 which is rotatably received in an opening 114 formed in top plate 26. As shown, a hex opening 116 is configured in at least one of the upper shafts 112. Upon insertion of a hex tool into hex opening 116, rotation of the hex tool results in rotation of that bar 88. By virtue of the respective planet gears 102 being connected through center sun gear 110, all of the elongated bars 88 rotate in unison in the same direction by the identical amount of rotation. In this way, a different alignment key 92 is moved into the operable orientation by which it can be used to radially align laminas 16 to be stacked on the arbor.

In operation, the arbor provides a plurality of rotatable elongated bars 88, each capable of holding a plurality of different alignment keys 92. The arbor is set up by loading each bar 88 with at least one of a first type of alignment key and at least one of a second type of alignment key. In the embodiment shown, each bar 88 can contain six different alignment keys, with the same type of key being inserted in the same face position. The bars 88 orient one of the six keys in the operative position to radially align a particular stack of laminas, which have a slot gap corresponding to that alignment key.

When it becomes necessary to set up the arbor to receive a stack of laminas with a different gap requiring a different alignment key, the hex tool (not shown) is inserted into the hex opening 116. Using the hex tool so inserted, the operator rotates this elongated bar. Such rotation causes the desired alignment key to be rotated into the operative position for that particular station on the arbor. Moreover, because of the arrangement of planet gears 102 and center sun gear 110, and the initial ordering of the alignment keys in each bar 88, this rotation also simultaneously rotates the same alignment key in each of the other bars into the operative position on the arbor. Thus, the arbor is set up and ready to receive the new stack of laminas for radial alignment thereof.

It can be seen that the present invention provides an expanding arbor having a plurality of simultaneously rotatable key holders 86. In the illustrated embodiment, key holders 86 are located about core 14 so as to be inside of the inner circumference of lamina 16. However, some lamina, such as armature lamina for a DC motor, may have slots defined on the outer circumferential surface. As such, the invention includes key holders that are spaced radially from the core to function with lamina of this type.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An expanding arbor for producing a lamination stack from a plurality of individual laminas having a central opening and a plurality of slots extending radially from said opening, the arbor comprising:

a base portion;

an expandable core extending axially from said base portion;

a plurality of key holders disposed around said core and extending axially from said base portion, each said key holder holding a plurality of key elements, one of said key elements being in an operative position for engaging at least one of said slot.

2. An arbor as set forth in claim 1, wherein each said key holder is rotatable to orient a preselected key element into said operative position.

3. An arbor as set forth in claim 2, further comprising a mechanism operative to simultaneously rotate each said key holder to orient said preselected key element into said operative position.

4. An arbor as set forth in claim 3, wherein said simultaneously rotating mechanism includes a center sun gear and a plurality of planet gears, each of said center sun gear and said planet gears being rotatably mounted with respect to said base portion, each said planet gear being connected to one of said key holders and being disposed to engage said center sun gear wherein rotation of one of said key holders causes rotation of said center sun gear and rotation of each other of said planet gears and connected key holders.

5. An arbor as set forth in claim 1, wherein each said key holder defines a plurality of key receptacles, each said key receptacle being configured to receive a key element therein.

6. An arbor as set forth in claim 1, wherein each said key holder defines an elongated bar having a polygonal transverse cross-section with a plurality of faces, each said face defining a key receptacle configured to receive a key element therein.

7. An arbor as set forth in claim 6, wherein each said key holder defines a hex bar having a hexagonal transverse cross-section.

8. An arbor as set forth in claim 1, wherein said key holders are disposed radially adjacent said core such that said key elements can engage slots defined on an inner circumference of said central opening.

9. An expanding arbor for assembling a lamination stack from a plurality of individual laminas each having a central opening and a plurality of slots extending radially from said opening, the arbor comprising:

a base portion;

an expandable core extending axially from said base portion;

a plurality of key holders disposed around said core, each said key holder being configured in the form of an elongated bar extending axially from said base portion and having a polygonal transverse cross-section with a plurality of faces, each said face defining a key receptacle for receiving a key therein;

a center sun gear rotatably mounted with respect to said base portion;

a plurality of planet gears disposed around said center sun gear, each of said planet gears being rotatably mounted with respect to said base portion, each said planet gear being connected to one of said key holders and being disposed to engage said center sun gear wherein rotation of one of said key holders causes rotation of said center sun gear and rotation of each other of said planet gears and connected key holders.

* * * * *